United States Patent
Born et al.

[11] Patent Number: 5,994,422
[45] Date of Patent: Nov. 30, 1999

[54] HOT-CURING RUBBER FOAMS WITH HIGH STRUCTURAL STRENGTH

[75] Inventors: Peter Born, Sandhausen; Frank Dittrich, Sinsheim; Michael Hirthammer, Heidelberg, all of Germany

[73] Assignee: Henkel-Teroson GmbH, Heidelburg, Germany

[21] Appl. No.: 08/952,394

[22] PCT Filed: May 13, 1996

[86] PCT No.: PCT/EP96/02048

§ 371 Date: Nov. 18, 1997

§ 102(e) Date: Nov. 18, 1997

[87] PCT Pub. No.: WO96/36660

PCT Pub. Date: Nov. 21, 1996

[30] Foreign Application Priority Data

May 20, 1995 [DE] Germany .................. 195 18 673

[51] Int. Cl.$^6$ ............................................. C08J 9/00
[52] U.S. Cl. .................... 521/139; 521/81; 521/140; 521/149; 521/150
[58] Field of Search ........................ 521/139, 140, 521/150, 149, 81

[56] References Cited

U.S. PATENT DOCUMENTS

| | | | |
|---|---|---|---|
| 3,606,326 | 9/1971 | Sparks et al. | 273/81 R |
| 4,130,535 | 12/1978 | Coran et al. | 525/211 |
| 4,311,628 | 1/1982 | Abdou-Sabet et al. | 525/232 |
| 4,537,115 | 8/1985 | Haesters | 98/2.18 |
| 4,657,938 | 4/1987 | Fithian et al. | 521/96 |
| 4,680,316 | 7/1987 | Douglas | 521/89 |
| 5,393,796 | 2/1995 | Halberstadt et al. | 54/134 |
| 5,654,346 | 8/1997 | Halberstadt et al. | |

FOREIGN PATENT DOCUMENTS

| | | |
|---|---|---|
| 0 383 498 | 8/1990 | European Pat. Off. . |
| 0 611 778 | 8/1994 | European Pat. Off. . |
| 33 26 030 | 1/1985 | Germany . |
| 35 16 194 | 11/1986 | Germany . |
| 58/089 350 | 5/1983 | Japan . |
| 61-116 509 | 6/1986 | Japan . |
| 1-166 939 | 6/1989 | Japan . |
| 0 453 777 | 10/1991 | Japan . |
| 3-269 080 | 11/1991 | Japan . |
| 5-059 345 | 3/1993 | Japan . |
| 5-192 937 | 8/1993 | Japan . |
| 836 201 | 6/1960 | United Kingdom . |

*Primary Examiner*—Morton Foelak
*Attorney, Agent, or Firm*—Ernest G. Szoke; Wayne C. Jaeschke; Stephen D. Harper

[57] ABSTRACT

Hot-curing, foamable reactive compositions based on natural and/or synthetic rubbers containing olefinic double bonds, vulcanizing agents and blowing agents with a high percentage content of sulfur give foamed rubber compositions exhibiting high structural strength and high volume expansion. These compositions are suitable as multifunctional filling materials for hollow structures or hollow profiles in vehicle or machine construction. At one and the same time, they perform a sealing function, damp acoustic vibration and stiffen the hollow structures to a considerable extent.

30 Claims, 1 Drawing Sheet

HOT-CURING RUBBER FOAMS WITH HIGH STRUCTURAL STRENGTH

This invention relates to hot-curing, foamable reactive compositions based on natural and/or synthetic rubbers, vulcanizing and blowing agents, to their production, to their use for filling cavities in vehicle or machine construction and to a process for stiffening such cavity structures and, at the same time, damping acoustic vibrations.

BACKGROUND OF THE INVENTION

In the manufacture of motor vehicles, haulage vehicles and in machine construction, cavities are formed in the assembly of the vehicle or machine parts. In self-supporting bodies in particular, there are many of these cavity structures for establishing the necessary stiffness or strength of the body, including for example the so-called A, B and C pillars, sills and roof frames of automobiles and commercial vehicles. Under normal driving conditions, troublesome noise and sounds are transmitted through these cavities or are formed therein by vibrating columns of air. In order to damp this troublesome noise, the cavities are at least partly filled with sealants. These filling compounds damp or absorb troublesome noise and vibration and, in addition, prevent the entry of moisture and foreign substances.

Numerous proposals have already been put forward with a view to solving the problem of sealing these cavities to protect them against the entry of moisture and foreign substances and to reduce noise (airborne sound). These proposals may roughly be divided into four groups:

Preformed expanding materials: EP-A-453777 proposes, for example, a mechanical plug of thermally expanding sealing material to be fixed in the cavity; particulars of its composition are not provided.

EP-A-383498 describes preformed foamable parts consisting of copolymers of ethylene with ethyl acrylate which contain blowing agents. The sealing elements are preformed by extrusion and have to be fixed in the cavity to be sealed with mechanical fastenings before foaming.

Similarly, preformed thermally expanding sealing compositions based on metal salts of carboxylated ethylene copolymers (ionomers), blowing agents and tackifiers can be produced in accordance with EP-A-611778.

Preformed and cut, soft-elastic foams based on rubbers or poly-urethanes; examples of such foams can be found in DE-C-3326030, in DE-C-3516194 or in JP-A-89166939.

Foamable reactive liquid polymers such as, for example, polyurethane systems: according to JP-A-86116509, a two-component polyurethane system is directly injected into the corresponding cavities in situ by means of a mixing and metering unit, subsequently foaming and curing in the cavities. According to JP-A-93192937, the cavities may contain bag-like containers at the places to be sealed. A foaming liquid is injected into these bag-like containers which it then fills by foaming so that a section of the cavity is sealed. JP-A-91269080 describes a hot-melting composition based on thermoplastic rubbers, tackifiers and waxes or oils which are physically foamed and then cast into the cavities to be filled where they solidify by cooling.

According to JP-A-93059345, paste-like thermally expanding filling compositions based on liquid rubbers, solid rubbers, vulcanizing agents, plasticizers and blowing agents are introduced into the cavities to be sealed where they foam and vulcanize on heating. These foamed vulcanizates have very limited hardness (Shore A hardness generally below 5) and a tensile shear strength of generally well below 0.1 MPa.

One feature common to all hitherto known cavity sealing materials, also known as pillar fillers, is that they perform the sealing function and the noise-damping function (damping of airborne sound) fairly satisfactorily. In vehicle construction, more especially in automobile construction, every effort is made to make the passenger compartments stiffer to increase passenger safety without at the same time adding significantly to the overall weight of the vehicle body. Accordingly, it would be desirable if the cavity structures of the vehicles could contribute towards increased stiffness.

DETAILED DESCRIPTION OF THE INVENTION

Figure 1:
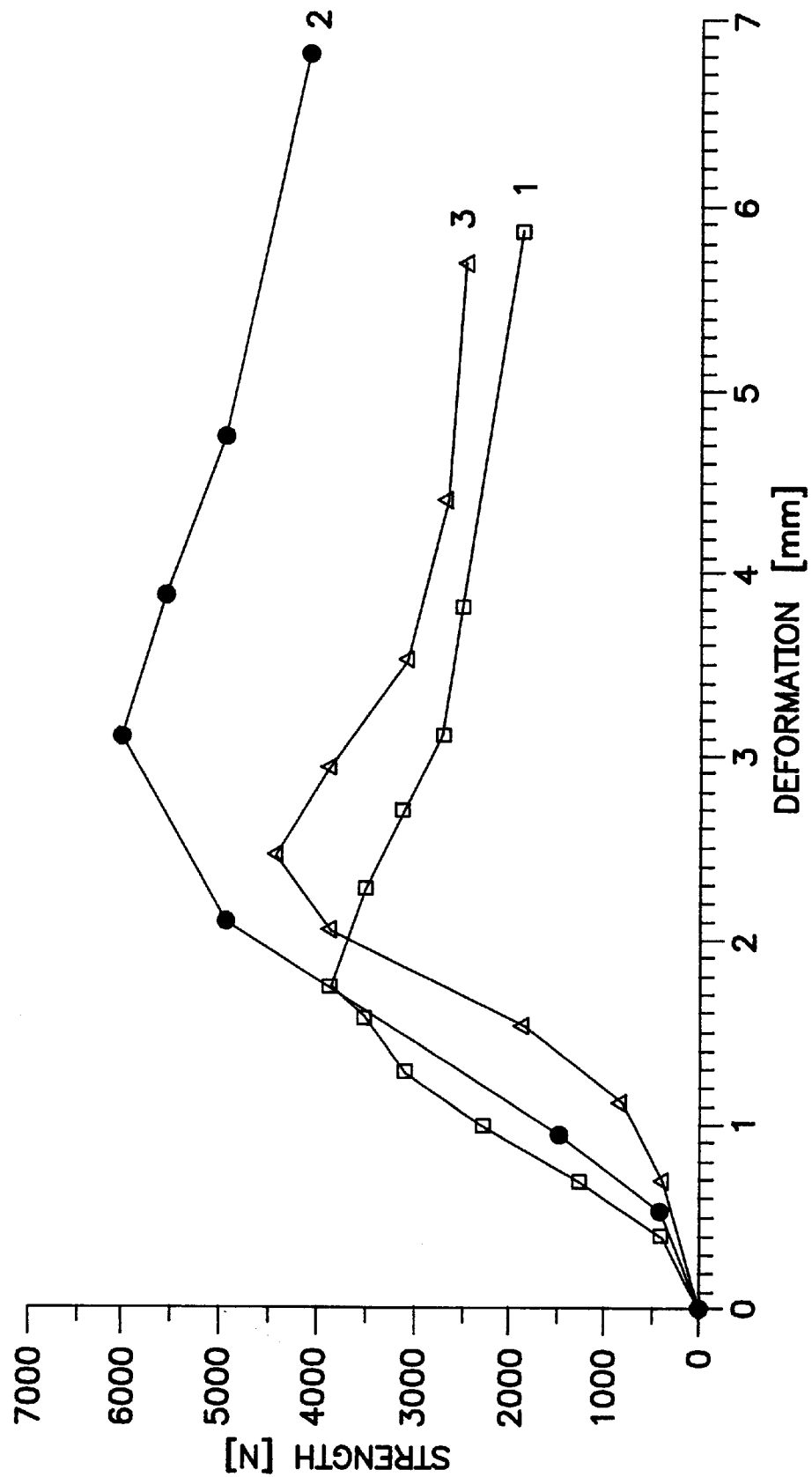
FIG. 1 shows the maximum force of the compression test plotted against the deformation value for one embodiment of the invention.

It has now been found that hot-curing, foamable reactive compositions based on natural and/or synthetic rubbers containing olefinic double bonds, vulcanizing and blowing agents are capable of performing a triple function. They are able to seal acoustically damp (damping of airborne sound and mechanical vibration) and structurally stiffen hollow structures, especially in vehicle construction, providing they are composed in such a way that, during curing, they undergo an expansion in volume of at least 100% and, in their cured state, have a Shore A hardness of at least 30. However, the expansion in volume during curing should amount to at least 200% and, in a particularly preferred embodiment, to at least 300% and the cured foam should preferably have a Shore A hardness of at least 50 and, in a particularly preferred embodiment, at least 70.

The foamable reactive compositions according to the invention contain at least one of the following substances:

one or more liquid rubbers and/or solid rubbers or elastomers vulcanizing agents, vulcanization accelerators, catalysts fillers tackifiers and/or coupling agents blowing agents extender oils antiagers rheology aids.

The liquid rubbers or elastomers contain at least one olefinically unsaturated double bond per molecule. They may be selected from the following group of homopolymers and/or copolymers: Polybutadienes, more especially 1,4- and 1,2-polybutadienes, polybutenes, polyisobutylenes, 1,4- and 3,4-polyisoprenes, styrene/butadiene copolymers, butadiene/acrylonitrile copolymers, one or more of these polymers containing terminal and/or (statistically distributed) lateral functional groups. Examples of such functional groups are hydroxy, amino, carboxyl, carboxylic anhydride or epoxy groups. The molecular weight of these liquid rubbers is typically below 20,000 and preferably in the range from 900 to 10,000. The percentage content of liquid rubber in the composition as a whole is determined by the desired rheology of the uncured composition and by the required mechanical stiffness of the cavity/foam composite and by the acoustic damping properties of the cured composition. The percentage content of liquid rubber or elastomer normally varies between 5 and 50% by weight of the formulation as a whole. It has proved to be useful to use mixtures of liquid rubbers of different molecular weight and different configuration in regard to the remaining double bonds. To achieve optimal adhesion to the various substrates, a liquid rubber component containing hydroxyl or anhydride groups is used in the particularly preferred formulations. At least one of the liquid rubbers should have a high percentage content of cis-1,4-double bonds while another of the liquid rubbers should have a high percentage content of vinyl double bonds.

Suitable solid rubbers have a significantly higher molecular weight (MW=100,000 or higher) by comparison with the liquid rubbers. Examples of suitable solid rubbers are polybutadiene, preferably with a very high percentage of cis-1,4-double bonds (typically over 95%), styrene/butadiene rubber, butadiene/acrylonitrile rubber, synthetic or natural isoprene rubber, butyl rubber or polyurethane rubber.

The compositions according to the invention may optionally contain fine-particle thermoplastic polymer powders. Examples of suitable thermoplastic polymers are polypropylene, polyethylene, thermoplastic polyurethanes, methacrylate copolymers, styrene copolymers, polyvinyl chloride, polyvinyl acetal and, in particular, polyvinyl acetate and copolymers thereof such as, for example, ethylene/vinyl acetate copolymers. Although the particle size or rather particle size distribution of the polymer powders does not appear to be particularly critical, the mean particle size should be below 1 mm and is preferably below 350 $\mu$m. The quantity of thermoplastic polymer powder optionally added is between 2 and 20% by weight and preferably between 2 and 10% by weight.

The crosslinking or curing reaction of the rubber composition and the foaming reaction have a critical influence on the sealing function, on the acoustic damping effect and on the stiffening effect of the hollow structure so that the vulcanization system and the composition of the blowing agent have to be selected and adapted with particular care. Various vulcanizing agents in combination with elemental sulfur are suitable for the vulcanization system although vulcanization systems with no free sulfur may also be used. The latter include vulcanization systems based on thiuram disulfides, organic peroxides, polyfunctional amines, quinones, p-benzoquinone dioxime, p-nitrosobenzene and dinitrosobenzene or even crosslinking with (blocked) diisocyanates. However, vulcanization systems based on elemental sulfur and organic vulcanization accelerators and also zinc compounds are most particularly preferred. The powder-form sulfur is used in quantities of 4 to 15% by weight, based on the composition as a whole, and preferably in quantities of 6 to 8% by weight. Suitable organic accelerators are dithiocarbamates (in the form of their ammonium or metal salts), xanthogenates, thiuram compounds (monosulfides and disulfides), thiazole compounds, aldehyde/amine accelerators (for example hexamethylene tetramine) and also guanidine accelerators. Dibenzothiazyl disulfide (MBTS) or diphenyl guanidine is most particularly preferred. These organic accelerators are used in quantities of 2 to 10% by weight, based on the formulation as a whole, and preferably in quantities of 3 to 8% by weight. Among the zinc compounds acting as accelerators, a choice may be made between the zinc salts of fatty acids, zinc dithiocarbamates, basic zinc carbonates and, in particular, fine-particle zinc oxide. The content of zinc compounds is between 1 and 10% by weight and preferably between 3 and 7% by weight. Other typical rubber vulcanization auxiliaries, such as fatty acids (stearic acid), may also be present in the formulation.

To ensure that the composition foams during the curing reaction, it is possible in principle to use any of the usual blowing agents, although organic blowing agents from the class of azo compounds, N-nitroso compounds, sulfonyl hydrazides or sulfonyl semicarbazides are preferred. Azobis-isobutyronitrile and, in particular, azodicarbonamide are mentioned as examples of azo compounds suitable for use in accordance with the invention while dinitrosopentamethylenetetramine is mentioned as an example of a nitroso compound, 4,4'-hydroxy-bis-(benzenesulfonic acid hydrazide), diphenylsulfone-3,3'-disulfohydrazide and benzene-1,3-disulfohydrazide are mentioned as examples of the sulfohydrazides and p-toluene sulfonyl semicarbazide is mentioned as an example of a semicarbazide.

Although the compositions according to the invention generally show very good adhesion to the substrates which are to be foamed by virtue of the preferred content of liquid rubber containing functional groups, tackifiers and/or coupling agents may be added if necessary. These include, for example, hydrocarbon resins, phenolic resins, terpene/phenol resins, resorcinol resins or derivatives thereof, modified or unmodified resinic acids or esters (abietic acid derivatives), polyamines, polyaminoamides, anhydrides and anhydride-containing copolymers. The addition of polyepoxy resins in small quantities can also improve adhesion to some substrates. In this case, however, the solid epoxy resins with a molecular weight of over 700 are preferably used in finely ground form. If tackifiers or coupling agents are used, the type and quantity used will be determined by the polymer composition of the pillar filler and by the substrate to which the composition is applied. Typical tackifying resins (tackifiers), such as terpene/phenol resins or resinic acid derivatives for example, are used in concentrations of 5 to 20% by weight while typical coupling agents, such as polyamines, polyaminoamides or phenolic resins or resorcinol derivatives, are used in concentrations of 0.1 to 10% by weight.

The compositions according to the invention are preferably free from plasticizers and extender oils. However, it may be necessary to influence the rheology of the uncured composition and/or the mechanical properties of the cured composition by addition of so-called extender oils, i.e. aliphatic, aromatic or naphthenic oils. This is preferably done by suitably selecting the low molecular weight liquid rubbers or by using low molecular weight polybutenes or polyisobutylenes. If extender oils are used, they are used in quantities of 2 to 15% by weight.

The fillers may be selected from a number of materials, including in particular chalks, natural or ground calcium carbonates, calcium/magnesium carbonates, silicates, heavy spar and carbon black. It may be useful for the fillers to be at least partly surface-pretreated. Coating with stearic acid to reduce the moisture introduced and the sensitivity to moisture of the cured composition has proved to be useful, particularly in the case of the various calcium carbonates or chalks. The compositions according to the invention may optionally contain from 1 to 5% by weight of calcium oxide. The total content of fillers in the formulation may vary between 10 and 70% by weight and is preferably between 25 and 60% by weight.

For protection against thermal, thermo-oxidative or ozone-induced degradation, the compositions according to the invention may contain conventional stabilizers or antiagers, for example sterically hindered phenols or amine derivatives, typically in quantities of 0.1 to 5% by weight.

Although the rheology of the compositions according to the invention can normally be brought into the required range through the choice of the fillers and the quantity ratio of the low molecular weight liquid rubbers, conventional rheology aids, for example pyrogenic silicas, Bentones or fibrillated or pulped chopped fibers, may be added in quantities of 0.1 to 7%. Other conventional auxiliaries and additives may also be used in the compositions according to the invention.

A preferred field of application for the hot-curing, foamable reactive compositions according to the invention is at the so-called white shell stage of automobile construction where the parts which subsequently form the cavities in bodywork are readily accessible so that the compositions can be applied by conventional pumps and metering units for paste-form materials. The process temperatures of the various paint ovens, i.e. temperatures in the range from 80° C. to 240° C. are then available for about 10 to 35 minutes for the curing and foaming reaction of the compositions. In a preferred embodiment, the body or parts thereof are passed through a so-called "EC oven" for foaming and curing the compositions according to the invention, temperatures of 160 to 200° C. typically prevailing in EC ovens.

The compositions according to the invention may be formulated free from low molecular weight epoxy resins and are therefore inexpensive and toxicologically safe. The highly expanding foam structure is incompressible or only slightly compressible and shows acoustic activity, i.e. the maximum of the loss factor is at room temperature (around 20° C.) and is greater than 0.1. The loss factor is measured by the Oberst method at 200 Hz, as described in DIN 53440, Part 3. A combination of three technical functions is thus performed by a single product, namely:

- sealing against penetrating moisture and foreign substances
- acoustic damping (airborne sound and mechanical vibration)
- structural stiffening of the hollow structure.

The compositions according to the invention may also be successfully used at places which are not hollow structures in the context of the definition according to the invention, for example on the insides of vehicle doors. Hitherto, so-called bitumen mats have been adhesively secured to such surfaces for acoustic damping. Since, in modem automobile construction, the doors have been made so inaccessible through numerous fittings, such as motor-driven window mechanisms, side impact protection systems or loud speaker fittings, that conventional bitumen mats can only be bonded in place with considerable difficulty, the compositions according to the invention may also be successfully used there.

EXAMPLES

The following Examples are intended to illustrate the present invention without limiting it in any way.

In an evacuable laboratory kneader, the compositions listed in the following Table were mixed in vacuo until they were homogeneous. Unless otherwise indicated, all parts in the Examples are parts by weight. The composition of the Comparison Example was prepared in accordance with JP-A-93059345 (Derwent Abstract Accession No. 93-121614).

TABLE 1

|  | Example 1 | Comparison Example |
|---|---|---|
| Polybutadiene, solid 1) | 5.0 | 10.0 |
| Polybutadiene, liquid 2) | 5.0 | — |
| Polybutadiene, liquid 3) | 15.0 | 27.2 |
| Polybutadiene, liquid 4) | 5.0 | 4.0 |
| Polyvinyl acetate, powder 5) | 5.0 | — |
| Phenolic resin, ground | — | 3.0 |
| Zinc oxide, active | 4.0 | 2.2 |
| Sulfur, powder | 7.0 | 2.1 |
| Diphenyl guanidine | 5.0 | — |
| Dibenzothiazyl disulfide | — | 1.9 |
| Antioxidant | 0.5 | 0.5 |
| Diphenoxydisulfohydrazide | 1.0 | 0.7 |
| Phthalic anhydride | — | 0.5 |
| Carbon black, powder | 0.5 | 0.5 |
| Chalk | 47.0 | 47.6 |
| Volume expansion 6) | 304% | 210% |
| Shore A hardness 6) | 77 | 4 |
| Tensile shear strength 6)7) | 0.49 MPa | 0.08 MPa |

1) Cis-1,4 at least 98%, Mooney viscosity 48 (ML4-100)
2) MW approx. 1800, cis-1,4 approx. 72%
3) MW approx. 1800, vinyl approx. 40–50%
4) MW approx. 2800, OH-terminated polybutadiene
5) EVA copolymer, Tg approx. 23° C.
6) Curing: 30 mins. at 180° C.
7) Test specimen bodywork steel St1405, 0.8 mm thick, oiled with ASTM No. 1
Overlap: 25 mm × 25 mm
Adhesive layer thickness: 3 mm
Test speed: 50 mm/min.

As can be seen from Table 1, the composition according to the invention, after curing and foaming, has a Shore A hardness higher by 1½ orders of magnitude. At the same time, its tensile shear strength and volume expansion are significantly greater than those of the comparison composition. The foam based on the compositions according to the invention has a closed-cell structure and a completely compact outer skin so that Shore hardness can be unequivocally determined.

Stiffening Effect

To test the stiffening effect of the foamed compositions, a hollow profile of rectangular cross-section was made from bodywork steel ST1404, thickness 0.8 mm. To this end, two Z-shaped steel profiles 70 mm long and 50 mm wide were fitted together by spot welding (at 4 points) in such a way that a square cavity measuring 25×50×70 mm was formed. 25 g of the hot-curing foamable compositions were introduced into the cavity and were then heated for 30 minutes to 180° C. so that they cured and foamed at the same time. After cooling and before the compression resistance test, the surplus of foamed material which had preswollen outwards was cut off to leave a smooth surface. In a compression test carried out in a Zwick testing machine, the test specimen thus prepared was clamped in such a way that the pressure was applied to the narrow side of the square (area 25×70 mm). By recording a force-deformation diagram, it was possible to determine the maximum force $F_{max}$ required to initiate deformation of the profile and, from this value, the increase in force required to deform the filled profile by comparison with the empty profile. In addition, the area below the force-deformation curve was determined so that the relative increase in area of the filled profile as compared with the empty profile could be calculated. This increase in area is a measure of the additional energy which a hollow structure thus stiffened is capable of absorbing as deformation energy.

TABLE 2

| | Stiffening Effect | | |
|---|---|---|---|
| Filler | — | Example 1 | Comparison Example |
| Maximum force $F_{max}$ [N] | 3843 | 5997 | 4416 |
| Increase in force [%] | ±0[1] | +56 | +7.9 |
| Area A [AE][2] | 0.0584 | 0.1106 | 0.0625 |
| Increase in area [%] | ±0[1] | +89 | +7.0 |

[1]Reference value: steel profile, empty
[2]AE = (relative) area units

As can be seen from Table 2, an increase in force of only about 8-fold compared with the empty steel profile is obtained with foamable rubber material according to the prior art whereas a 56-fold increase in force is achieved with the composition according to the invention. The advantage of the compositions according to the invention is reflected even more clearly in the increase in area which is a measure of the deformation energy to be absorbed. In this case, the stiffening effect is more than 10 times greater than that of a filling material according to the prior art.

The maximum force of the compression test is plotted against the deformation value in FIG. 1. Curve 1 is the force curve of the empty steel profile, curve 2 is the force-deformation curve of the steel profile filled with the foam composition according to the invention and curve 3 is the force-deformation curve of a profile filled with a foamed rubber composition according to the prior art.

What is claimed is:

1. A hot-curing foamable reactive pasty composition, comprising one or more uncured rubbers containing olefinic double bonds, a vulcanization system and a blowing agent, wherein the composition undergoes a volume expansion of at least about 100% while forming a foam during curing of the uncured rubbers and wherein the cured foam has a Shore A hardness of at least 30.

2. The composition as claimed in claim 1, wherein at least one of the uncured rubbers is a liquid polyene selected from the group consisting of 1,2-polybutadiene, 1,4-polybutadiene, polyisoprene, polybutene, polyisobutylene, copolymers containing butadiene with styrene, copolymers containing isoprene with styrene, copolymers containing butadiene and acrylonitrile, copolymers containing isoprene and acrylonitrile, copolymers of acrylates with dienes and mixtures thereof, wherein the molecular weight of the liquid polyene is in the range from about 900 to about 40,000.

3. The composition as claimed in claim 2, wherein the liquid polyene further comprises terminal and/or statistically distributed functional groups selected from the group consisting of carboxyl groups, carboxylic anhydride groups, hydroxyl groups, amino groups, mercapto groups or epoxy groups and mixtures thereof.

4. The hot-curing composition as claimed in claim 2, comprising at least one solid uncured rubber in a quantity of about 1.5 to about 9% by weight, based on the composition as a whole.

5. The composition as claimed in claim 2, comprising an uncured solid rubber selected from the group consisting of polybutadiene, styrene/butadiene rubber, synthetic isoprene rubber, natural rubber, ethylene/propylene/diene rubber, nitrile rubber, butyl rubber, polyacrylate rubber and mixtures thereof.

6. The hot-curing composition as claimed in claim 1, wherein the vulcanization system comprises sulfur, a organic vulcanization accelerator and a zinc compound.

7. The hot-curing composition as claimed in claim 6, wherein the vulcanization system comprises about 4% by weight to about 15% by weight of powder-form sulfur, about 2% by weight to about 8% by weight of an organic accelerator and about 1% by weight to about 8% by weight of a zinc compound, the percentages by weight being based on the composition as a whole.

8. The hot-curing composition as claimed in claim 1, wherein the blowing agent used is an organic blowing agent selected from the group consisting of azo compounds, nitroso compounds, sulfohydrazides, semicarbazides, and mixtures thereof.

9. The composition as claimed in claim 1, further comprising at least one additional component selected from the group consisting of fillers, rheology aids extender oils, coupling agents antiagers, fine-particle thermoplastic polymers, plasticizers, and tackifiers.

10. A method of producing the hot-curing foamable reactive pasty composition claimed in claim 1, comprising the step of high-shear mixing of the one or more uncured rubbers containing olefinic double bonds, the vulcanization system and the blowing agent.

11. A process for filling a cavity in a vehicle part comprising the steps of introducing into said cavity the hot-curing foamable reactive pasty composition claimed in claim 1 and heating said vehicle part to cure and foam the hot-curing foamable reactive pasty composition.

12. A vehicle part produced by the process of claim 11.

13. A process for filling a cavity in a machine part comprising introducing into said cavity the hot-curing foamable reactive pasty composition claimed in claim 1 and heating said machine part to cure and foam the hot-curing foamable reactive pasty composition.

14. A machine part produced by the process of claim 13.

15. The composition as claimed in claim 1 wherein the composition undergoes in volume expansion of at least about 200%.

16. The composition as claimed in claim 1 wherein the cured foam has a Shore A hardness of at least 50.

17. The composition as claimed in claim 1, further comprising a fine-particle thermoplastic polymer powder.

18. The composition as claimed in claim 1, wherein the cured foam has a loss factor greater than 0.1 as measured by the Oberst method at 200 Hz and wherein said loss factor has a maximum around 20° C.

19. A hot-curing foamable pasty reactive composition, comprising
    (a) from 5 to 50% by weight, based on the weight of the composition, of one or more uncured liquid rubbers containing olefinic double bonds,
    (b) from 1.5 to 9% by weight, based on the weight of the composition, of one or more uncured solid rubbers containing olefinic double bonds;
    (c) a vulcanization system comprised of sulfur, one or more organic vulcanization accelerators, and one or more zinc compounds; and
    (d) one or more organic blowing agents;
wherein the composition undergoes a volume expansion of at least about 200% while forming a foam during curing of the uncured liquid rubbers and uncured solid rubbers and wherein the cured foam has a Shore A hardness of at least 50 and a loss factor greater than 0.1 as measured by the Oberst method at 200 Hz, with said loss factor having a maximum around 20° C.

20. The composition as claimed in claim 19 wherein at least one of the liquid uncured rubbers is a polybutadiene.

21. The composition as claimed in claim 19 wherein at least one of the liquid uncured rubbers contains functional groups selected from the group consisting of hydroxy, amino, carboxyl, carboxylic anhydride, and epoxy.

22. The composition as claimed in claim 19 wherein at least one of the solid uncured rubbers is polybutadiene.

23. The composition as claimed in claim 22 herein the polybutadiene has a percentage of cis-1,4-double bonds greater than 95%.

24. The composition as claimed in claim 19, wherein the vulcanization system comprises about 5% by weight to about 10% by weight of sulfur in powder form, about 3% by weight to about 6% by weight of the organic accelerators, and about 2% by weight to about 6% by weight of the zinc compounds, the percentages by weight being based on the composition as a whole.

25. The composition as claimed in claim 19, wherein the organic blowing agents are selected from the group consisting of azo compounds, nitroso compounds, sulfohydrazides, semicarbazides, and mixtures thereof.

26. The composition as claimed in claim 19, further comprising at least one additional component selected from the group consisting of fillers, rheology aids, fine-particle thermoplastic polymers, plasticizers, extender oils, tackifiers, coupling agents, and antiagers.

27. A process for filling a cavity in a vehicle part comprising the steps of introducing the composition of claim 19 into said cavity and exposing said vehicle part to a temperature in the range of from 80° C. to 240° C. for a time of from about 10 to 35 minutes to cure and foam said composition.

28. A vehicle part produced by the process of claim 27.

29. A process for filling a cavity in a machine part comprising the steps of introducing the composition of claim 19 into said cavity and exposing said machine part to a temperature in the range of from 80° C. to 240° C. for a time of from abut 10 to 35 minutes to cure and foam said composition.

30. A machine part produced by the process of claim 29.

* * * * *